(12) United States Patent
Arsenault

(10) Patent No.: US 10,829,211 B2
(45) Date of Patent: Nov. 10, 2020

(54) LOCAL DIGITAL CONVERSION FOR FORCE AND POSITION SIGNALS FOR ELECTRIC ACTUATION CONTROL

(71) Applicant: GOODRICH CORPORATION, Charlotte, NC (US)

(72) Inventor: Tyler Arsenault, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 334 days.

(21) Appl. No.: 15/960,232

(22) Filed: Apr. 23, 2018

(65) Prior Publication Data

US 2019/0322359 A1 Oct. 24, 2019

(51) Int. Cl.
*B64C 25/42* (2006.01)
*B64C 25/44* (2006.01)
*B64C 13/50* (2006.01)

(52) U.S. Cl.
CPC ............ *B64C 25/44* (2013.01); *B64C 13/503* (2013.01)

(58) Field of Classification Search
CPC .................................................... B64C 24/44
See application file for complete search history.

(56) References Cited

U.S. PATENT DOCUMENTS

| | | |
|---|---|---|
| 6,345,225 B1 | 2/2002 | Bohm et al. |
| 8,002,090 B2 | 8/2011 | Yasukawa |
| 8,948,994 B2 | 2/2015 | Frank |
| 9,555,782 B2 | 1/2017 | Iordanidis et al. |
| 2008/0154470 A1 | 6/2008 | Goranson et al. |
| 2010/0106347 A1* | 4/2010 | Cahill ..................... B64C 25/44 701/3 |
| 2015/0151728 A1* | 6/2015 | Iordanidis ............... B64C 25/44 701/3 |
| 2015/0291280 A1* | 10/2015 | Iordanidis ............. B60T 8/1703 244/111 |
| 2017/0152027 A1* | 6/2017 | Onfroy ................... B64C 25/44 |
| 2019/0178905 A1* | 6/2019 | Zabulon ................. G01P 3/489 |

FOREIGN PATENT DOCUMENTS

| | | |
|---|---|---|
| EP | 0602697 | 6/1994 |
| EP | 1584927 | 10/2005 |
| EP | 2878501 | 6/2015 |
| EP | 2878502 | 6/2015 |
| EP | 3495825 | 6/2019 |

OTHER PUBLICATIONS

European Patent Office, European Search Report dated Nov. 22, 2019 in Application No. 19168678.1.

* cited by examiner

Primary Examiner — Richard G Davis
(74) Attorney, Agent, or Firm — Snell & Wilmer L.L.P.

(57) ABSTRACT

An electronic brake system for a vehicle may comprise an electromechanical actuator (EMA) arrangement located at a first location and comprising an EMA and a transmitter unit, and an electronic brake actuator controller (EBAC) located at a second location remote from the first location and comprising a receiver. The transmitter unit is configured to receive an analog sensor signal, convert the analog sensor signal to a digital sensor signal, and send the digital sensor signal to the receiver.

15 Claims, 6 Drawing Sheets

LOCAL DIGITAL CONVERSION FOR FORCE AND POSITION SIGNALS FOR ELECTRIC ACTUATION CONTROL

FIELD

The present disclosure relates to aircraft braking systems, and more specifically, to a system and method for control over braking of an aircraft.

BACKGROUND

An electronic brake actuator control system typically includes one or more sensors located at the brake assembly from which analog sensor feedback signals are sent to an electromechanical brake actuator controller located remote from the sensor. Long, low level analog signals being conducted over long wire lengths in the presence of high noise environments may compromise feedback signal integrity.

SUMMARY

An electronic brake system for a vehicle is disclosed, comprising an electromechanical actuator (EMA) arrangement located at a first location and comprising an EMA and a transmitter unit, and an electronic brake actuator controller (EBAC) located at a second location remote from the first location and comprising a receiver, wherein the transmitter unit is configured to receive an analog sensor signal, convert the analog sensor signal to a digital sensor signal, and transmit the digital sensor signal to the receiver.

In various embodiments, the first location is outside a fuselage of the vehicle in response to a landing gear being deployed.

In various embodiments, the second location is in the fuselage.

In various embodiments, the first location is at a wheel assembly of the vehicle.

In various embodiments, the electronic brake system further comprises a digital databus extending between the transmitter unit and the receiver whereby the digital sensor signal is received by the receiver.

In various embodiments, the EBAC further comprises an inverter configured to send power to the EMA.

In various embodiments, the transmitter unit comprises an analog-to-digital converter configured to convert the analog sensor signal to the digital sensor signal.

In various embodiments, the transmitter unit further comprises a transmitter configured to transmit the digital sensor signal to the receiver.

In various embodiments, the transmitter unit further comprises a plurality of transmitters, wherein the plurality of transmitters includes the transmitter.

In various embodiments, the electronic brake system further comprises a brake system control unit (BSCU) configured to receive input from at least one of an aircraft cockpit control and an avionic and issue braking force commands to the EBAC based on the input.

In various embodiments, the transmitter unit is configured to receive the analog sensor signal from a sensor disposed at the first location.

In various embodiments, the sensor comprises at least one of a load cell and a rotary sensor.

A method for installing an electronic braking system for a vehicle is disclosed, comprising disposing an electromechanical actuator (EMA) arrangement at a first location, the EMA arrangement comprising an EMA and a transmitter unit, disposing an electronic brake actuator controller (EBAC) at a second location, the EBAC comprising a receiver, and coupling the transmitter unit to the receiver via a digital databus. In various embodiments, the first location is outside a fuselage of the vehicle in response to a landing gear being deployed.

In various embodiments, the second location is in the fuselage.

In various embodiments, the first location is at a wheel assembly of the vehicle.

In various embodiments, the method further comprises disposing a sensor at the first location, disposing an analog-to-digital converter at the first location, and coupling the analog-to-digital converter to the sensor.

A method for transmitting a sensor signal to an electronic brake actuator controller (EBAC) is disclosed, comprising receiving, by a feedback controller, an analog signal from a sensor, wherein the feedback controller and the sensor are located locally at a wheel assembly, converting, by the feedback controller, the analog signal into a digital signal, and sending, by the feedback controller, the digital signal to the EBAC, wherein the EBAC is located remote from the feedback controller.

In various embodiments, the method further comprises receiving, by an electromechanical actuator (EMA), power from the EBAC.

In various embodiments, the EBAC is disposed in a fuselage of a vehicle.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

In various embodiments, an aircraft brake control system may comprise an electromechanical actuator (EMA) arrangement located at a first location and an electronic brake actuator controller (EBAC) located at a second location remote from the first location. The EMA arrangement includes an EMA and a transmitter unit. The EBAC includes a receiver. The transmitter unit is configured to convert an analog sensor feedback signal to a digital sensor feedback signal. The digital sensor feedback signal may be sent to the receiver. In this manner, sensor feedback signals are digitized locally at a brake assembly.

In various embodiments, two wires may be used to power the EMA arrangement and six wires may be used to conduct digital sensor feedback signals from each of the isolated digital transmitters (e.g., two wires per digital transmitter). The digital network may be performed using either Ethernet or a controller area network (CAN).

Figure 1:
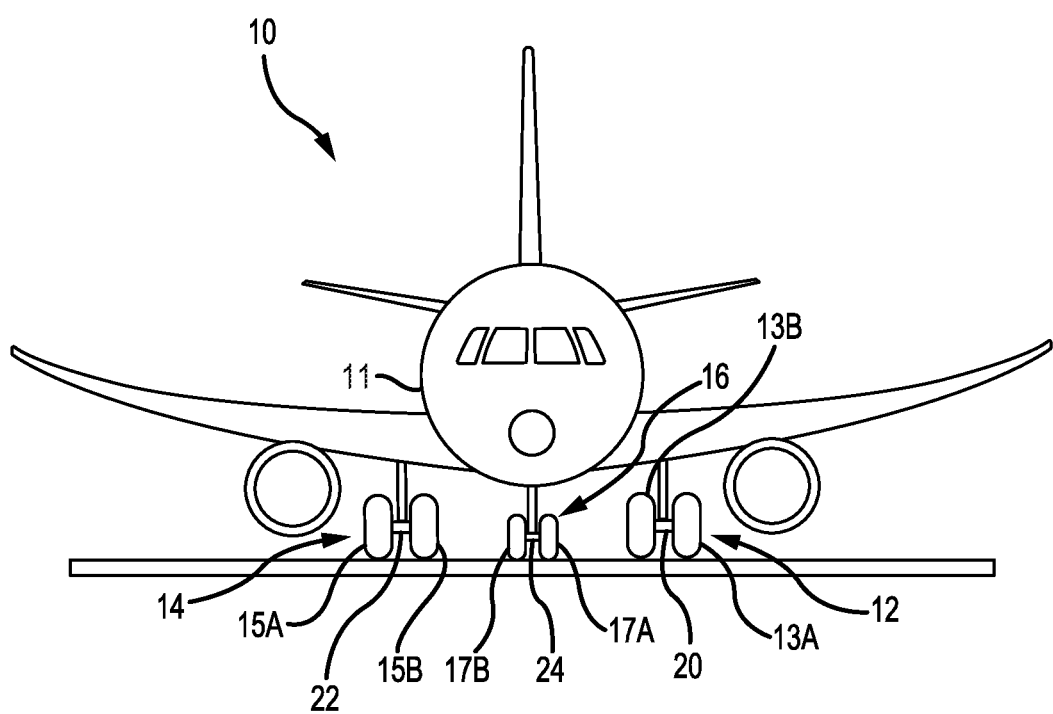
FIG. 1 illustrates an aircraft having landing gear, in accordance with various embodiments.

With reference to FIG. 1, an aircraft 10 in accordance with various embodiments may include a fuselage 11 and landing gear such as landing gear 12, landing gear 14 and landing gear 16. Landing gear 12, landing gear 14 and landing gear 16 may generally support aircraft 10 when aircraft is not flying, allowing aircraft 10 to taxi, take off, and land without damage. Landing gear 12 may include wheel 13A and wheel 13B coupled by a strut 20; landing gear 14 may include wheel 15A and wheel 15B coupled by a strut 22; and landing gear 16 may include nose wheel 17A and nose wheel 17B coupled by a strut 24. Wheel 13A and wheel 15A may be referred to as outboard wheels. Wheel 13B and wheel 15B may be referred to as inboard wheels. The nose wheels may differ from the main wheels in that the nose wheels may not include a brake.

Figure 2:
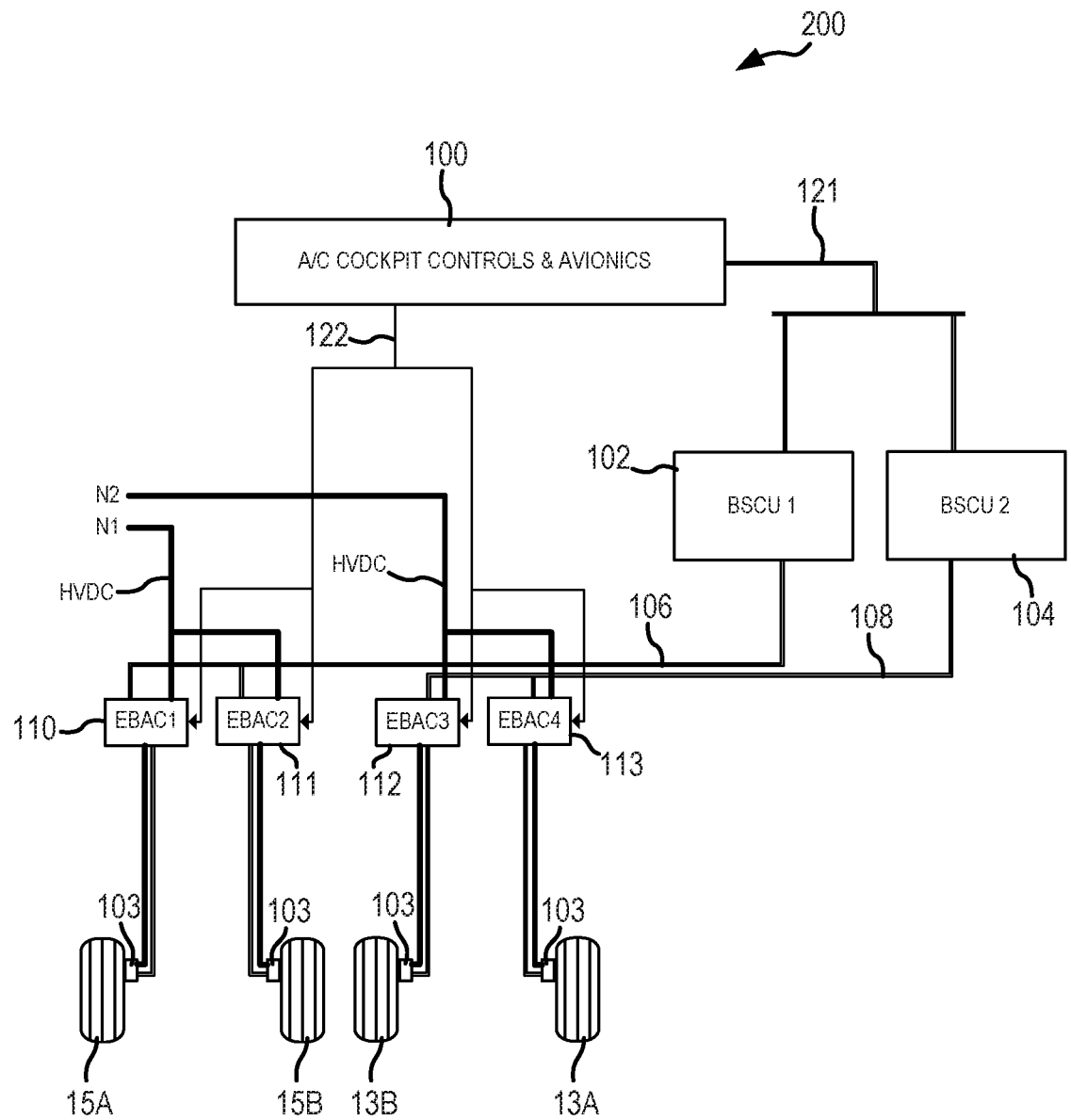
FIG. 2 illustrates a schematic view of an electronic brake control system, in accordance with various embodiments.

With reference to FIG. 2, an electronic braking system 200 is illustrated, in accordance with various embodiments. In FIG. 2, high power connections are drawn using bold lines, and information connections are drawn using fine lines, single lines for analog or discrete connections and pairs of lines for digital connections. A high power connection may be one suitable for transmitting high voltage signals (e.g., between 28 and 130 V) and information connections may be one suitable for digital and/or analog signals (e.g., between 0 and 5 V).

Electronic braking system 200 comprises brake system control units (BSCUs) 102, 104 assigned to one or more electronic brake actuator controllers (EBACs), i.e. EBAC 110, EBAC 111, EBAC 112, and/or EBAC 113. In the illustrated embodiment BSCU 102 is assigned to EBAC 110 and EBAC 111 and BSCU 104 is assigned EBAC 112 and EBAC 113. However, any configuration of assignments between BSCUs and EBAs is contemplated herein. For example, In various embodiments, each BSCU 102, 104 may be assigned to particular sides, e.g. aircraft avionics network or electrical power network sides. In various embodiments, BSCU 102 and BSCU 104 may be assigned to right and left wheel assemblies, respectively (15A, 15B, and 13A, 13B respectively). In various embodiments, BSCU 102 and BSCU 104 may be assigned to inboard and outboard wheel assemblies, respectively (13B, 15B, and 13A, 15A respectively). In various embodiments, BSCU 102 and BSCU 104 may each be redundantly assigned to both the inboard side and the outboard side, etc.

BSCU 102 and BSCU 104 receive input from aircraft cockpit controls and avionics 100 via one or more databuses 121. EBAC 110, EBAC 111, EBAC 112, and/or EBAC 113 receive input from aircraft cockpit controls and avionics 100 via one or more databuses 122 or analogue and/or discrete signals, e.g. from a brake pedal transmitter unit (BPTU) indicating a brake pedal angle. Note that not all signal routes are shown in the figures so as not to obscure the clarity of the description of the disclosure.

Figure 3:
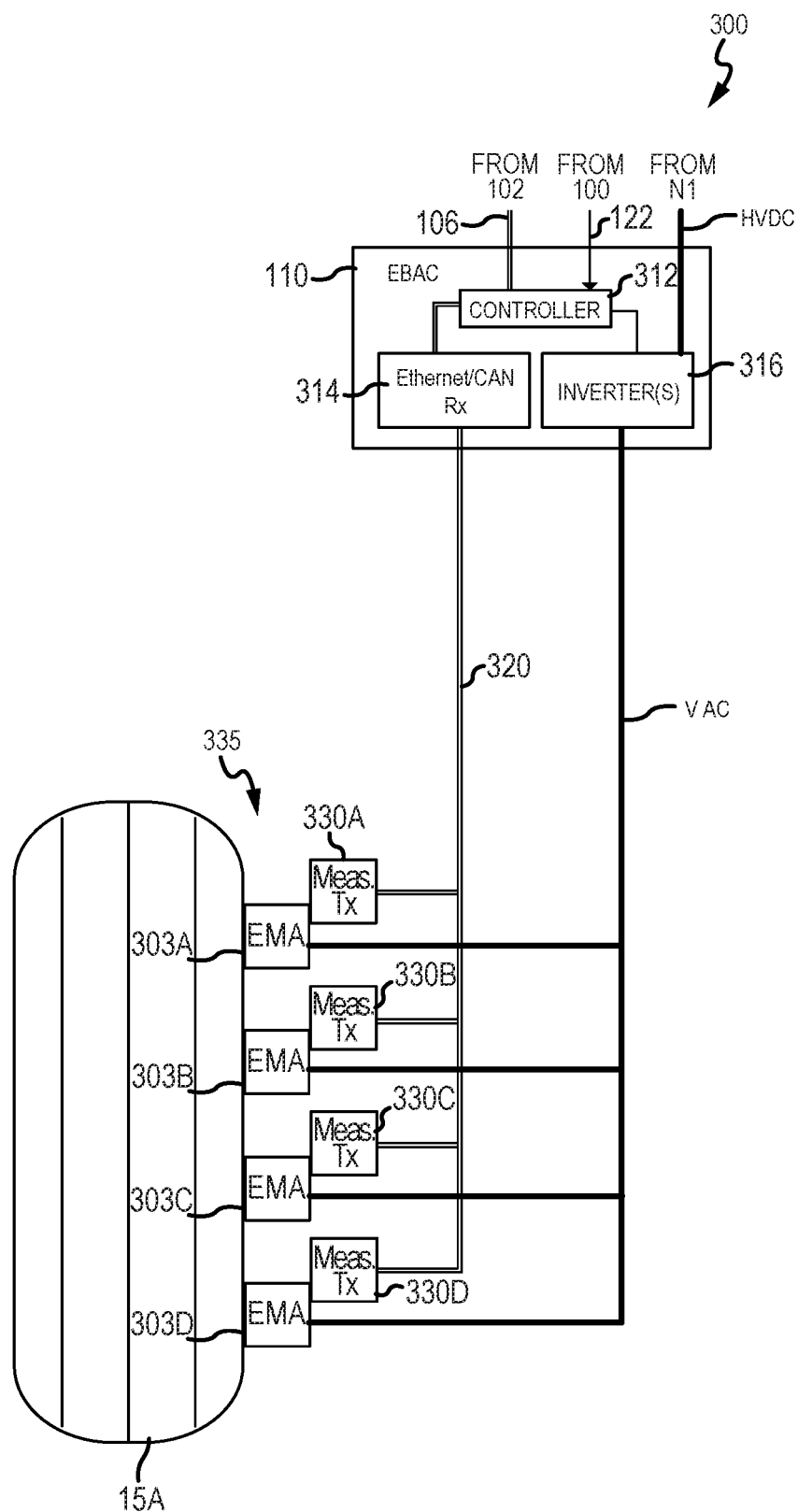
FIG. 3 illustrates a schematic view of a plurality of electromechanical actuator (EMA) arrangements disposed at a first location (i.e., a wheel assembly) and an electronic brake actuator controller (EBAC) located remote from the EMA arrangements, in accordance with various embodiments.

BSCU 102 and BSCU 104 may interpret signals from the aircraft cockpit controls and avionics 100 and issue braking force commands on a per wheel basis to EBAC 110, EBAC 111, EBAC, 112, and/or EBAC 113. In the aircraft configuration shown in FIG. 2 there are four wheels 15A, 15B, 13A, 13B each associated with one electromechanical actuators (EMA) 103. Of course, there may be a greater or fewer number of wheel and brake groups or EMAs. In various embodiments, each wheel 15A, 15B, 13A, 13B may be associated with four EMAs as illustrated in FIG. 3.

In various embodiments, each BSCU 102, 104 may be disposed together with one or more EBAC 110, 111, 112, and/or 113 in a common line replaceable unit (LRU). In various embodiments, each BSCU 102, 104 may be disposed separately from the EBACs 110, 111, 112, 113.

Each EBAC 110, 111, 112, 113 may be disposed remote from the EMAs 103. For example, the EBACs 110, 111, 112, 113 may be located in the fuselage 11 of aircraft 10 when the landing gear 12, 14 are deployed, with momentary reference to FIG. 1 and the EMAs 103 may be located at the wheels 15A, 15B, 13A, 13B (i.e., outside of fuselage 11).

EBAC 110, EBAC 111, EBAC 112, and EBAC 113 may be coupled via BSCU 102 and/or BSCU 104 to aircraft cockpit controls and avionics 100. BSCU 102 and/or BSCU 104 route digital databus signals from the aircraft cockpit controls and avionics 100 to EBAC 110, EBAC 111, EBAC 112, and/or EBAC 113 (and vice versa) via local databuses 106, 108. EBAC 110, EBAC 111, EBAC 112, and EBAC 113 may interpret brake force commands from BSCU 102 and/or BSCU 104 whereby EMAs 103 may be electronically actuated. EBAC 110, EBAC 111, EBAC 112, and EBAC 113 may receive electrical power from the aircraft power networks N1, N2 (note only the high voltage parts of the aircraft power networks N1, N2 are shown in FIG. 2). The EBACs 110, 111, 112, 113 may provide power and control signals to drive the EMAs 103.

The high voltage direct current (HVDC) power may be delivered from aircraft power networks N1, N2 to electronic brake actuator controllers (EBACs) 110, 111, 112, 113, in order to convert the HVDC power as delivered in this way into electric power suitable for the motors of EMAs 103 fitted to brakes associated with the wheels (i.e., wheel 15A, wheel 15B, wheel 13A, wheel 13B) of the aircraft.

With respect to FIG. 3, elements with like element numbering, as depicted in FIG. 2, are intended to be the same and will not necessarily be repeated for the sake of clarity.

With reference to FIG. 3, electronic braking system 300 comprising EBAC 110 in electronic communication with four EMAs, i.e. EMA 303A, EMA 303B, EMA 303C, and EMA 303D, associated with wheel 15A is illustrated, in accordance with various embodiments. In various embodiments, electronic braking system 200 may be similar to electronic braking system 300. EBAC 110 may include an inverter 316 configured to convert the HVDC power into AC power for the motors of EMA 303A, EMA 303B, EMA 303C, and EMA 303D. A microcontroller 312 may be in electronic communication with inverter 316 whereby inverter 316 may be controlled in response to input received via databus 106 and/or in response to input received via databus 122.

In various embodiments, EBAC 110 may include a receiver 314 configured to receive input via digital databus 320 from measure and transmitter units (also referred to herein as feedback controllers) 330A, 330B, 330C, 330D. With additional reference to FIG. 4, measure and transmitter units 330A, 330B, 330C, 330D may receive feedback signals from wheel and brake components, such as a load cell 450 and/or a rotary sensor (e.g., a resolver 452). A load cell measurement 402 received from load cell 450 may be converted from an analog signal to a digital signal via analog-to-digital converter 404. A resolver measurement 406 received from resolver 452 may be converted from an analog signal to a digital signal via analog-to-digital converter 408. A microcontroller 410 may receive the digital signals and send the signals to EBAC 110 via transmitter 412A, transmitter 412B, and/or transmitter 412C. Although illustrated as having three transmitters, measure and transmitter unit 330 may comprise any number of transmitters. In various embodiments, a first transmitter (e.g. transmitter 412A) may be used to transmit digital signals corresponding to a load cell and a second transmitter (e.g. transmitter 412B may be used to transmit digital signals corresponding to a resolver. In various embodiments, each transmitter 412A, 412B, 412C may transmit both resolver and load cell digital signals for redundancy purposes. In this regard, each transmitter 412A, 412B, 412C may comprise an associated digital databus 320A, 320B, 320C whereby resolver digital signals and load cell digital signals may be transmitted to receiver 314.

In various embodiments, the transmitter unit 330 may utilize an Ethernet system. An Ethernet system may utilize twisted-pair cabling. Ethernet may utilize packet and frame transmission. In various embodiments, the transmitter unit 330 may utilize a controller area network (CAN bus). A CAN bus may refer to a vehicle bus standard designed to allow microcontrollers and devices to communicate with each other in applications without a host computer. A CAN bus may be a message-based protocol.

In this regard, each EMA 303A, 303B, 303C, 303D comprises an analog-to-digital converter (e.g. analog-to-digital converter 404 and/or analog-to-digital converter 408) whereby sensor feedback signals may be locally converted from analog to digital signals. An EMA (e.g., EMA 303A) and a transmitter unit (e.g., transmitter unit 330A) may be collectively referred to therein as an EMA arrangement 335.

Figure 5:
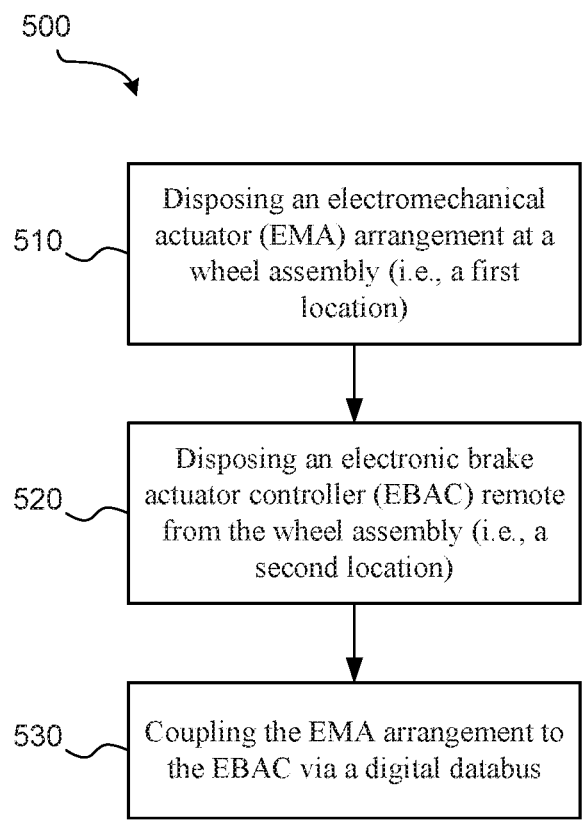
FIG. 5 illustrates a method for installing an electronic braking system, in accordance with various embodiments.

With reference to FIG. 5, a method 500 for installing an electronic braking system is illustrated, in accordance with various embodiments. Method 500 includes disposing an EMA arrangement at a wheel assembly (i.e., a first location) (step 510). Method 500 includes disposing an EBAC remote from the wheel assembly (i.e., a second location) (step 520). Method 500 includes coupling the EMA arrangement to the EBAC via a digital databus (step 530).

With combined reference to FIG. 3 and FIG. 5, step 510 may include disposing EMA arrangement 335 at wheel 15A. Step 520 may include disposing EBAC 110 remote from wheel 15A, for instance inside an airframe, such as fuselage 11 for example, with momentary reference to FIG. 1. EBAC 110 may remain in fuselage 11 when the landing gear is deployed while the EMA arrangement 335 may move from a portion of the airframe, e.g., a wheel well, to outside of airframe in response to a landing gear being deployed. Step 530 may include coupling EMA arrangement 335 to EBAC 110 via digital databus 320. Step 530 may include coupling transmitter 412A, with momentary reference to FIG. 4, to receiver 314 via digital databus 320.

Figure 6:
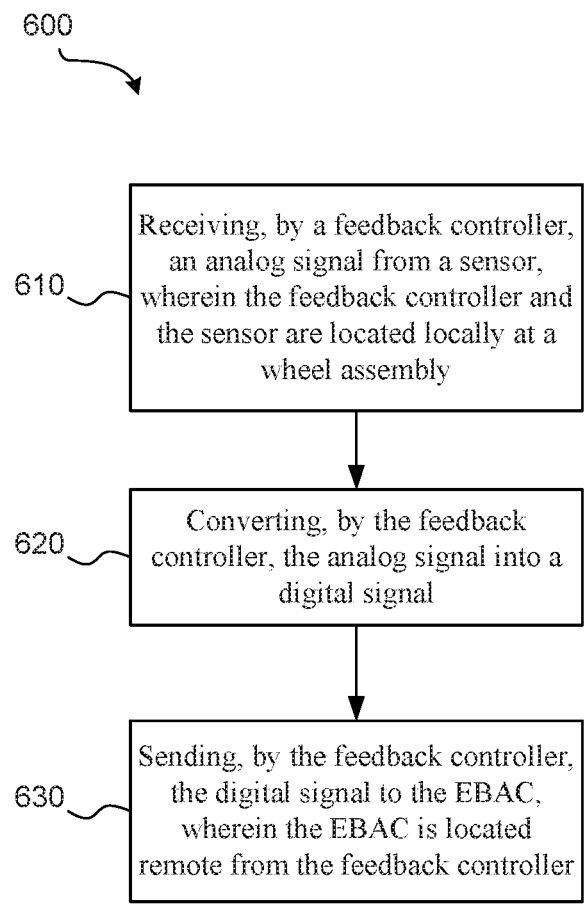
FIG. 6 illustrates a method for transmitting a sensor signal to an EBAC, in accordance with various embodiments.

With reference to FIG. 6, a method 600 for transmitting a sensor signal to an EBAC is illustrated, in accordance with various embodiments. Method 600 includes receiving, by a feedback controller, an analog signal from a sensor, wherein the feedback controller and the sensor are located locally at a wheel assembly (step 610). Method 600 includes converting, by the feedback controller, the analog signal into a digital signal (step 620). Method 600 includes sending, by the feedback controller, the digital signal to the EBAC, wherein the EBAC is located remote from the feedback controller (step 630).

Figure 4:
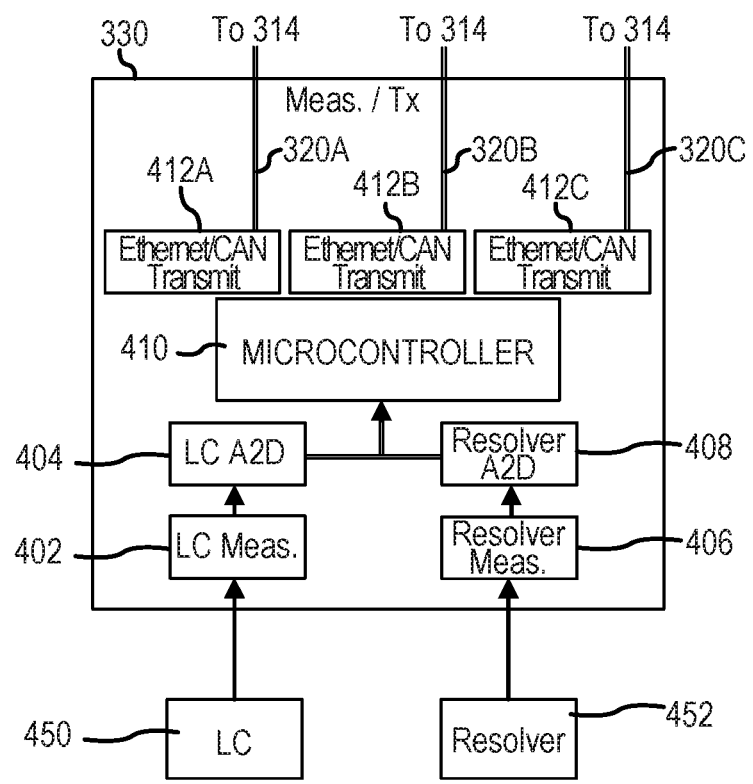
FIG. 4 illustrates one of the transmitter units of FIG. 3, comprising an analog-to-digital converter for sensor feedback signals, in accordance with various embodiments.

With combined reference to FIG. 3, FIG. 4, and FIG. 6, step 610 may include receiving, by transmitter unit 330, load cell measurement 402 and/or resolver measurement 406. Step 620 may include converting, by analog-to-digital converter 404 and/or analog-to-digital converter 408, load cell measurement 402 and/or resolver measurement 406, respectively, from an analog sensor signal to a digital sensor signal. Step 630 may include sending, by transmitter 412A, transmitter 412B, and/or transmitter 412C, the digital sensor signal to EBAC 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electronic brake system for a vehicle, comprising:
   an electromechanical actuator (EMA) arrangement located at a first location, the EMA arrangement comprising an EMA, a load cell, a rotary sensor, and a transmitter unit; and
   an electronic brake actuator controller (EBAC) located at a second location remote from the first location, the EBAC comprising a receiver and an inverter;
   wherein the inverter is configured to send power to the EMA;
   the transmitter unit comprises a first analog-to-digital converter, a second analog-to-digital converter, a first transmitter, and a second transmitter, and
   the transmitter unit is configured to:
      receive a first analog sensor signal from the load cell;
      receive a second analog sensor signal from the rotary sensor;
      convert the first analog sensor signal to a first digital sensor signal via the first analog-to-digital converter;
      convert the second analog sensor signal to a second digital sensor signal via the second analog-to-digital converter;
      transmit the first digital sensor signal to the receiver via the first transmitter; and
      transmit the second digital sensor signal to the receiver via the second transmitter.

2. The electronic brake system of claim 1, wherein the first location is outside a fuselage of the vehicle in response to a landing gear being deployed.

3. The electronic brake system of claim 2, wherein the second location is in the fuselage.

4. The electronic brake system of claim 3, wherein the first location is at a wheel assembly of the vehicle.

5. The electronic brake system of claim 4, further comprising a digital databus extending between the transmitter unit and the receiver whereby the digital sensor signal is received by the receiver.

6. The electronic brake system of claim 1, further comprising: a brake system control unit (BSCU) configured to receive input from at least one of an aircraft cockpit control and an avionic and issue braking force commands to the EBAC based on the input.

7. The electronic brake system of claim 1, wherein the transmitter unit further comprises a third transmitter configured to transmit at least one of the first digital sensor signal and the second digital sensor signal to the receiver.

8. The electronic brake system of claim 7, wherein:
   a first two wires extend between the EMA and the inverter, whereby the EMA receives power;
   a second two wires extend between the first transmitter and the receiver, whereby the first digital sensor signal is transmitted to the receiver;
   a third two wires extend between the second transmitter and the receiver, whereby the second digital sensor signal is transmitted to the receiver; and
   a fourth two wires extend between the third transmitter and the receiver, whereby at least one of the first digital sensor signal and the second digital sensor signal is transmitted to the receiver.

9. A method for installing an electronic braking system for a vehicle, comprising:
   disposing an electromechanical actuator (EMA) arrangement at a first location, the EMA arrangement comprising:
      an EMA;
      a load cell;
      a rotary sensor; and
      a transmitter unit;
   disposing an electronic brake actuator controller (EBAC) at a second location, the EBAC comprising:
      a receiver; and
      an inverter; and
   coupling the transmitter unit to the receiver via a digital databus,
   wherein the inverter is configured to send power to the EMA;
   the transmitter unit comprises a first analog-to-digital converter, a second analog-to-digital converter, a first transmitter, and a second transmitter; and
   the transmitter unit is configured to:
      receive a first analog sensor signal from the load cell;
      receive a second analog sensor signal from the rotary sensor;
      convert the first analog sensor signal to a first digital sensor signal via the first analog-to-digital converter;
      convert the second analog sensor signal to a second digital sensor signal via the second analog-to-digital converter;
      transmit the first digital sensor signal to the receiver via the first transmitter; and
      transmit the second digital sensor signal to the receiver via the second transmitter.

10. The method of claim 9, wherein the first location is outside a fuselage of the vehicle in response to a landing gear being deployed.

11. The method of claim 10, wherein the second location is in the fuselage.

12. The method of claim 11, wherein the first location is at a wheel assembly of the vehicle.

13. A method for transmitting a sensor signal to an electronic brake actuator controller (EBAC), comprising:
   receiving, by a feedback controller, a first analog signal from a load cell, wherein the feedback controller and the load cell are located locally at a wheel assembly;
   receiving, by the feedback controller, a second analog signal from a rotary sensor, wherein the feedback controller and the rotary sensor are located locally at the wheel assembly;
   converting, by the feedback controller, the first analog signal into a first digital signal;
   converting, by the feedback controller, the second analog signal into a second digital signal; and sending, by the feedback controller, the first digital signal and the second digital signal to the EBAC, wherein the EBAC is located remote from the feedback controller.

14. The method of claim 13, further comprising receiving, by an electromechanical actuator (EMA), power from the EBAC.

15. The method of claim 13, wherein the EBAC is disposed in a fuselage of a vehicle.

* * * * *